Aug. 26, 1947.  W. F. HOISINGTON  2,426,217
DIRECTION AND DISTANCE INDICATING SYSTEM
Filed Sept. 14, 1942    2 Sheets-Sheet 1

INVENTOR
WILLIAM F. HOISINGTON
BY R. F. Morris
ATTORNEY

Aug. 26, 1947.   W. F. HOISINGTON   2,426,217
DIRECTION AND DISTANCE INDICATING SYSTEM
Filed Sept. 14, 1942   2 Sheets-Sheet 2

INVENTOR
WILLIAM F. HOISINGTON
BY
ATTORNEY

Patented Aug. 26, 1947

2,426,217

UNITED STATES PATENT OFFICE 2,426,217

DIRECTION AND DISTANCE INDICATING SYSTEM

William F. Hoisington, Rye, N. Y., assignor to Federal Telephone and Radio Corporation, a corporation of Delaware Application September 14, 1942, Serial No. 458,256

20 Claims. (Cl. 250—1.62)

This invention relates to improvements in direction and distance indicating systems, and more particularly to an arrangement for simplifying such systems without adversely affecting their reliability and operation.

Direction and distance indicating systems are now known, by means of which both the direction and distance of an intercepted object can be read directly upon the screen of a cathode ray tube. Such systems may utilize, for example, a cathode ray beam rotating in synchronism with a continuously rotating antenna, as disclosed in the copending application of Henri G. Busignies, Serial No. 380,982, filed February 28, 1941. In this and similar systems, rotation of the cathode ray beam is effected by means of magnetic deflection coils rotatable with the antenna. Such coils, however, are of necessity relatively large and awkward, resulting in difficult constructional problems if the apparatus is to be made neat and compact.

One of the objects of the present invention is to provide a system wherein such magnetic deflection coils are replaced by a simpler and smaller device serving the same functional purpose.

Another object of this invention is to provide an improved automatically compensated voltage distributor for controlling the rotation of the beam of a cathode ray tube.

Still another object of this invention is to provide a direction and distance indicating system which provides a choice in the manner in which the intercepted object is indicated.

These and other objects and advantages of the invention, which will appear as the description proceeds, can be determined from the following description of a preferred embodiment thereof, taken in connection with the attached drawings, wherein.

Figure 1:
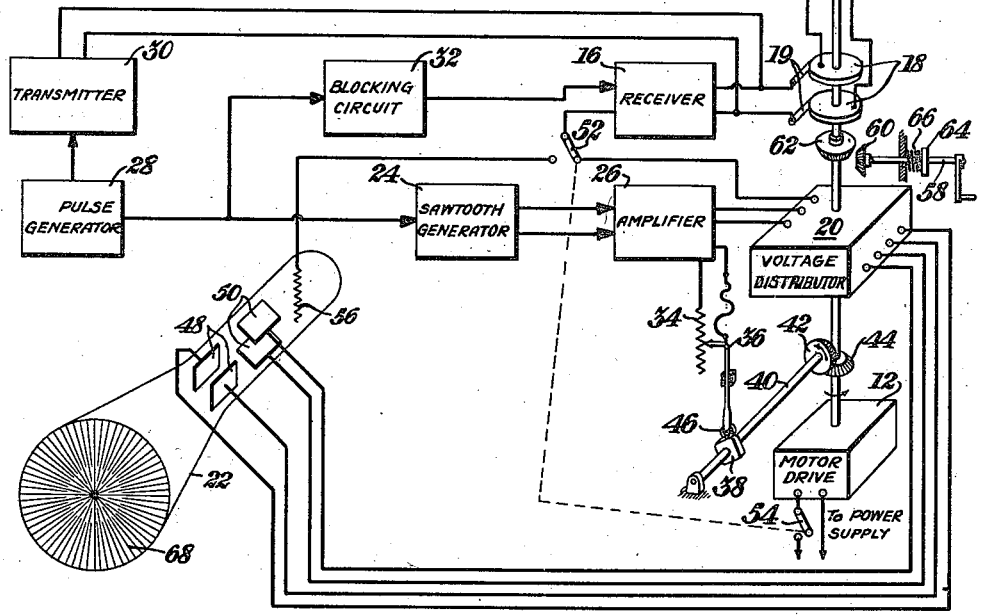
Fig. 1 is a block circuit diagram of a direction and distance indicating system in accordance with the present invention, also illustrating certain of the apparatus in perspective.

The system illustrated in Fig. 1 includes a suitable antenna 10 which may be of the parabolic type, rotated by suitable means indicated as the motor drive 12. The motor drive 12 may be a directly connected motor, including a servomotor, or any other motor drivably connected to the shaft 14 through suitable speed-selecting means (not shown). The antenna 10 may be connected to a suitable receiver 16 by any suitable means such as slip rings 18 and sliding contactors 19. A voltage distributor 20, the details of which will be described hereinafter is operated synchronously with the shaft 14, and supplies a 2-phase voltage to the cathode ray tube 22. A sawtooth generator 24, preferably acting through an amplifier 26 supplies a potential varying between predetermined limits to the distributor 20. The sawtooth generator 24, in turn, is actuated by a pulse generator 28, which is also connected to a transmitter 30 used to transmit suitable impulses from the antenna 10. As illustrated, the same antenna is used for both the receiver and transmitter. To protect the receiver 16 from the modulated transmitting wave, a blocking circuit 32 is coupled between the pulse generator 28 and the receiver 16 to control the operation of the receiver 16 in a well-known manner.

The sawtooth voltage impressed upon the distributor 20 from the amplifier 26 may be controlled by a variable resistor 34 controlling, for example, the grid of an amplifier stage so as to change one of the potential limits of the sawteeth in accordance with the distribution position of the device 20. The movement of the arm 36 of the variable resistor 34 is controlled by a suitably shaped cam 38 mounted upon the shaft 40 and driven synchronously with the rotation of the shaft 14 by interconnecting gears 42 and 44. The motion of the cam 38 may be transmitted to the movable arm 36 by suitable means including a follower 46.

The cathode ray tube 22 is provided with the usual vertical and horizontal deflecting plates 48, 50. Switching means 52 may be used to connect the receiver 16 either to the distributor 20 (in the position shown) or to the grid 56 of the cathode ray tube 22. A switch 54 may be used to connect or disconnect the motor drive 12 from its source of power. Preferably, the switches 52 and 54 are suitably interlocked or combined in a single switching device such as a double-pole, double-throw switch so that the motor will be disconnected when the receiver is connected to the distributor 20, and the motor will continually rotate the antenna 10 when the receiver is connected to the grid 56 of the cathode ray tube. Means such as the crank 58 are also provided for rotating the antenna by hand. The crank 58 may be interconnected with the shaft 14 by gears 60, 62 but, in order to prevent engagement of the crank when the shaft 14 is being driven by the motor drive 12, the crank 58 may be normally held in a disengaged position by means such as the spring 66 acting upon a collar 64 connected to the crank shaft.

Figure 3:
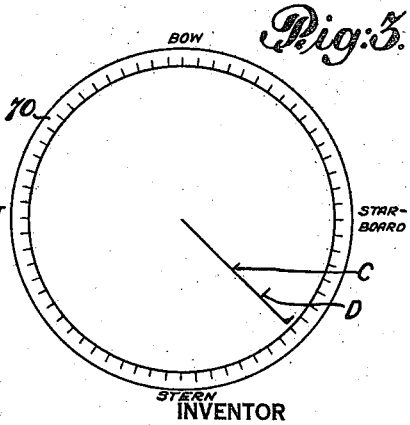
Fig. 3 is a front view of a cathode ray screen illustrating another indication of the direction and distance of an intercepted object.

When the switch 52 is in the position illustrated in Fig. 1, connecting the receiver 16 to the distributor 20, at which time the motor drive will be disconnected, the antenna 10 is rotatably adjusted by the crank 58 and a reflected signal passing through the receiver 16 will then pass through the distributor 20, being impressed upon one of the deflecting plates 48, 50 to give a pulse indication such as shown at C, or D in Fig. 3 along a sweep trace of the cathode ray tube. The screen 68 of the cathode ray tube may be surrounded by a scale 70 to indicate the relative direction of the intercepted signal. At the same time, by means of some well-known suitable scale such, for example, as the alidade disclosed in the aforementioned application of Henri G. Busignies, the distance of the pulse upon the screen from the center thereof may be read directly in miles or kilometers.

Figure 2:
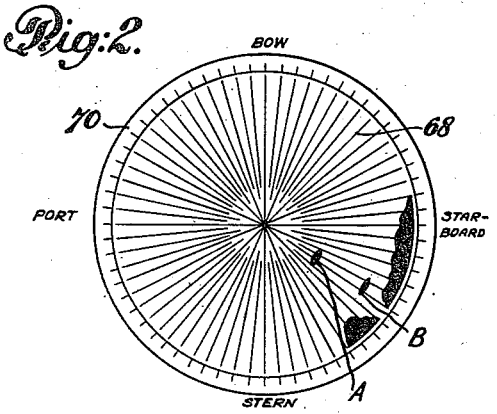
Fig. 2 is a front view of a cathode ray screen illustrating one manner in which the direction and distance of an intercepted object may be indicated.

If, on the other hand, the switch 52 connects the receiver 16 directly to the grid 56 of the cathode ray tube, at which time the antenna 10 is continuously rotated by the motor drive 12, points of variable intensity, such as A and B in Fig. 2 will appear upon the cathode ray screen 68 in response to the reception of a reflected pulse. It will be understood that while the antenna is stationary only a single radial tracing such as indicated in Fig. 3 will appear on the screen. When the antenna is rotated at a given speed, the sweeps made by the beam are equally separated as indicated by the radial tracings on the screen of Fig. 2. These tracings, however, may be very faint or even unobservable taken alone and observable when they coincide as in the case of the tracing of Fig. 3. When the antenna is continuously rotated and the receiver is connected directly to the grid of the cathode ray tube, the system will function substantially the same as that in the aforementioned Busignies application.

Figure 4:
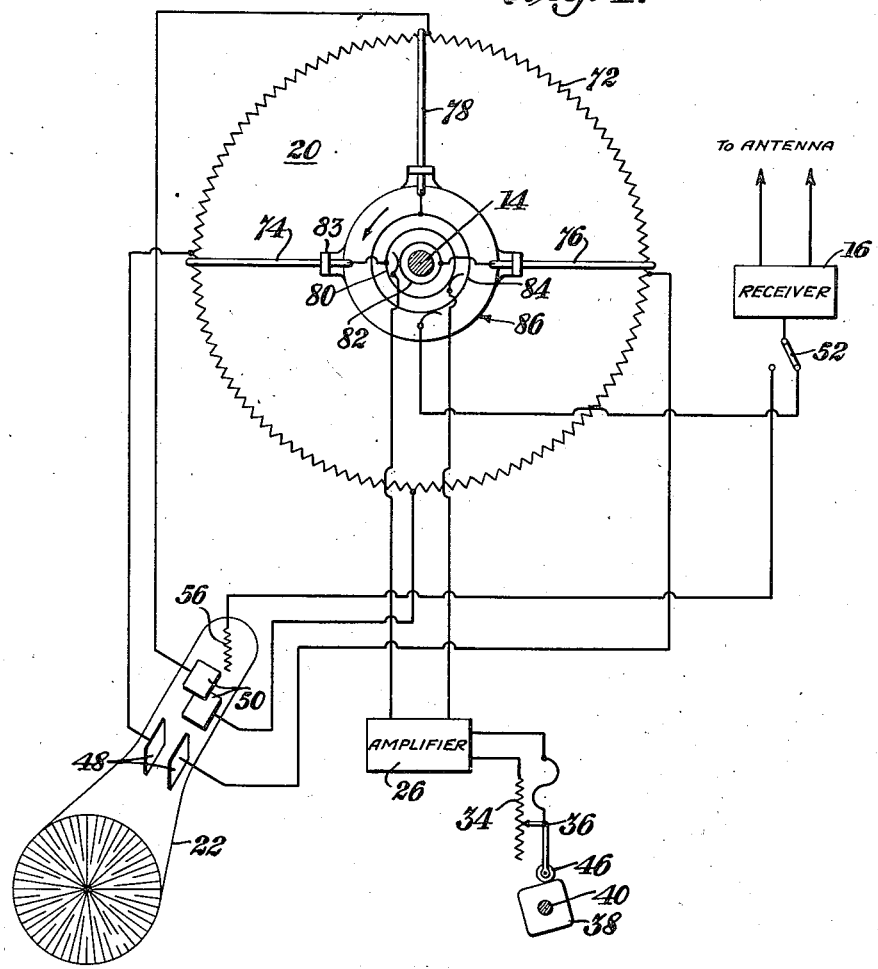
Fig. 4 is a circuit diagram illustrating details of the voltage distributor indicated in Fig. 1.

Fig. 4 illustrates the details of the annular resistance or distributor 20 diagrammatically indicated in Fig. 1, and the relationship between this distributor and the receiver and cathode ray tube 22. In the form distributor shown, the annular resistance 72 is stationary and is tapped at four equally circumferentially spaced points. One set of oppositely tapped points are connected, for example, to the vertical electrodes 48 and the other set of oppositely tapped points are connected to the horizontal electrodes 50. The voltage supplied by the amplifier 26 is connected across oppositely directed resistance-contacting arms 74 and 76, while a third arm 78 is positioned at right angles to the arms 74 and 76. The current from the amplifier 26 may be connected to the corresponding arms through any suitable means such as slip rings 80 and 82. When the switch 52 is in the position indicated, the receiver is also connected to the distributor 20, and, more specifically, to the intermediate arm 78, by any suitable means illustrated as slip ring 84. The arms 74, 76 and 78 and slip rings 80, 82 and 84 are mounted by any suitable supports 83 from an insulating member 86 directly or indirectly connected for rotation with the antenna shaft 14. If the switch 52 is connected to its other position, the receiver 16 will be directly connected to the grid 56 of the cathode ray tube, as explained in connection with Fig. 1.

The general operation of the foregoing system will, it is believed, be clear to those skilled in this art. Assuming, for example, that the motor drive 12 is connected to the source of power, rotating the antenna at such a speed that pulses may be transmitted and the reflected signal received before the antenna has appreciably changed its direction, and the switch 52 so connected that the receiver 16 is connected to the grid 56 of the cathode ray tube, a suitable pulse wave will first be transmitted from the antenna 10. As soon as this wave has been transmitted, through the action of the blocking circuit 32 the receiver 16 will be conditioned to receive any reflected wave. Rotation of the antenna 10 by the motor drive 12 will, at the same time, rotate the radial scanning produced by the beam of the cathode ray tube 22, since through the rotation of the distributor arms the energization of the electrodes 48 and 50 will be continuously and synchronously varied. This will result in a plurality of equally spaced radial tracings in accordance with Fig. 2. If a reflected wave is received, the grid 56 will be energized at a predetermined period in the movement of the cathode ray beam such that a bright spot of light will appear on the cathode ray screen. The position of this bright light spot is determined both by the time between the original and reflected pulses and by the position of the antenna 10 so that a direct reading of direction and distance may be determined. Due, however, to possible interference it may be difficult to determine whether there actually is a bright spot at any point on the screen 68. If there is a suspicion of a bright spot which it is desired to more accurately verify, the motor drive may be deenergized and the receiver connected to the voltage distributor. The antenna is then slowly rotated by the crank 58 in the vicinity of the position which was apparently indicated on the fluorescent screen. If a reflected wave actually exists at this point the same will appear as a clearly distinguishable pulse on the screen as indicated, for example, in Fig. 3. This is due to the fact that the receiver 16 is now connected through the distributor to the appropriate deflecting plate of the cathode ray tube, and any received pulse will deflect transversely the otherwise radially scanned beam. It will thus be seen that in accordance with the present invention the person operating the distance and direction system has a choice of indicating media which will assure greater accuracy than if one alone were used.

Figure 5:
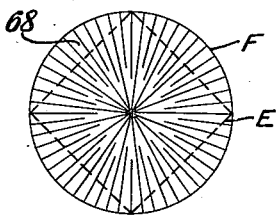
Fig. 5 shows a front view of a cathode ray screen and diagrammatically illustrates the compensation of the voltage distributor afforded by the present invention.

In connection with the use of the voltage distributor, it will be realized by those skilled in this art that due to the resistance of the distributor itself between the equally spaced taps, and due also to the inherent resistances and capacities of the leads and their effect upon the electron flow within the cathode ray tube, it is impossible to produce a resultant sweep of the electron beam which will be equal in all radial directions. For example, unless some compensation is made, the pattern of the radial tracings may have a shape such as indicated in dotted lines at E in Fig. 5 instead of equal lengths as shown at F. However, compensation may be effected in a simple manner by varying the output voltage of the amplifier so as to increase this voltage between the tapped points on the resistor 72. In the preferred form of invention illustrated, I contemplate effecting the desired compensation by means of a variable resistor 34 which may, for example, control the grid of one of the amplifier stages, and this resistor will be varied in accordance with the position of the resistor contacting arms 74, 76, 78 by means of a suitably shaped cam 38 rotated synchronously with the arms. This cam may be formed as an integral part of the voltage distributor 20, but, for the sake of clarity, in the accompanying drawings this has been illustrated as mounted upon a separate shaft 40 driven from the shaft 14 and, through a suitable follower 46, varying the position of the adjustable resistance arm 36. The shape of the compensating cam 38 may be experimentally determined and, once determined, may remain fixed. One form of cam which may be used and which is well-known in the art is a cam whose surface is formed of thin sheet metal adjustable by means of set screws.

While I have illustrated only one physical embodiment of the present invention, it will be clear to those skilled in this art that other modifications may be used which are both electrically and mechanically full equivalents to the apparatus illustrated. For example, in connection with the voltage distributor 20, it makes no difference whether the arms 74, 76, 78 are rotated members, or whether these are stationary and the resistance 72 itself rotates with the antenna. Additionally, while a single antenna 10 has been shown for both the transmitter and the receiver, it is also equally clear that separate antennas both mounted for synchronous rotation could also be used. The manner in which the antenna is hand-operated is also unimportant. If desired, for example, the hand crank might be provided with a magnetic clutch interlocked with the power supply switch for the motor drive, so that if the motor drive were energized the hand crank would be disconnected and vice versa. Accordingly, these and other changes may be made in the disclosed system without departing from the substance of the present invention as expressed in the claims which follow.

What I claim is:

1. In a direction and distance indicating system of the type wherein generated pulse waves are radiated from and the reflected waves are received by rotating antenna, the combination of a receiver connected to said antenna, an annular resistance having four equally spaced taps, a cathode ray tube having an electron beam-producing means and two pairs of beam-deflecting electrodes spaced at right angles to one another, means for connecting one pair of electrodes across one set of oppositely spaced taps and the other pair of electrodes across the other set of oppositely spaced taps, a member rotatable with said antenna, having oppositely directed arms insulated from one another and contacting said resistance, a potential source varying between predetermined limits connected across said arms, means for initiating the energization of said potential source by said generated pulse wave, whereby rotation of said member varies the voltage on said electrodes to cause rotation of the beam in accordance with rotation of said antenna, means for changing one of said predetermined limits of said varying potential source according to the contact relation of said arms with respect to said resistance between said taps, whereby the deflection of said beam is equal in all radial directions, means for rotating said antenna and member, and means for connecting said receiver to said cathode ray tube for controlling said beam in accordance with the received reflected waves.

2. The combination according to claim 1, in combination with means for driving said limit-changing means by said rotating means.

3. The combination according to claim 1, in which the means for changing one of said predetermined limits includes a cam and a potential-varying device operated by said cam, in combination with means for rotating said cam synchronously with the rotation of said member.

4. The combination according to claim 1, in which said potential source includes an amplifier adapted to produce said varying voltage, and said limit-changing means includes means for varying the output voltage of said amplifier.

5. The combination according to claim 1, in which said potential source includes an amplifier adapted to produce said varying voltage, and said limit-changing means includes means for varying the output voltage of said amplifier, in combination with means for driving said amplifier voltage-varying means by said rotating means.

6. A combination according to claim 1, in which said potential source includes an amplifier adapted to produce said varying voltage, and said limit-changing means includes a cam and a potential-varying device operated by said cam for varying the output voltage of said amplifier, in combination with means for rotating said cam synchronously with the rotation of said member.

7. The combination according to claim 1, in which said potential source includes an amplifier adapted to produce said varying potential and in which said limit-changing means includes a variable resistor in the circuit of said amplifier.

8. The combination according to claim 1, in which said potential source includes an amplifier adapted to produce said varying potential and in which said limit-changing means includes a variable resistor in the circuit of said amplifier in combination with means rotatable with said member for varying said resistor.

9. The combination according to claim 1, in which said potential source includes an amplifier adapted to produce said varying potential and in which said limit-changing means includes a variable resistor in the circuit of said amplifier and a cam rotatable with said member for varying said resistor.

10. The combination according to claim 1, in which said last means includes a third resistance-contacting arm mounted on said member at right angles to and insulated from said other arms, and means for connecting said receiver to said third arm.

11. In a direction and distance indicating system of the type wherein generated pulse waves are radiated from and the reflected waves are received by rotating antenna, the combination of a receiver connected to said antenna, an annular resistance having four equally spaced taps, a cathode ray tube having an electron beam-producing means, a control grid, and two pairs of beam-deflecting electrodes spaced at right angles to one another, means for connecting one pair of electrodes across one set of oppositely spaced taps and the other pair of electrodes across the other set of oppositely spaced taps, a member rotatable with said antenna, having three resistance-contacting arms insulated from one another, two of said arms extending in opposite directions and the third arm extending at right angles to both the other arms, a potential source connected across said oppositely directed arms, means for initiating the energization of said potential source by said generated pulse waves, whereby rotation of said member varies the voltage of said electrodes to cause rotation of the beam during the rotation of said antenna, a motor drivably connected to said rotatable antenna, hand-operated means for rotating said antenna, means for alternatively connecting said receiver to said cathode ray grid or to said third arm, means for controlling the energization and deenergization of said motor, and means for controlling the engagement of said hand-operated means with said antenna.

12. In combination, an annular resistance having four equally circumferentially spaced taps, a cathode ray tube having an electron beam-producing means and two pairs of beam-deflecting electrodes spaced at right angles to one another, means for connecting one pair of electrodes across one set of oppositely spaced taps and the other pair of electrodes across the other set of oppositely spaced taps, a rotatable member having oppositely directed arms insulated from one another and contacting said resistance, means for supplying a potential varying between predetermined limits across said arms, whereby rotation of said member varies the voltage on said electrodes to cause rotation of the beam in accordance with the rotation of said member, means for increasing the voltage of said potential source beyond said predetermined limit whenever said arms contact said resistance between said taps, whereby the deflection of said beam is equal in all radial directions, and means for rotating said rotatable member.

13. The combination according to claim 12, in combination with means for driving said voltage-increasing means by said rotating means.

14. The combination according to claim 12, in which the means for increasing said voltage includes a cam and a potential-varying device operated by said cam, in combination with means for rotating said cam synchronously with the rotation of said member.

15. The combination according to claim 12, in which said potential source includes an amplifier adapted to produce said varying voltage and said voltage-increasing means includes means for varying the output voltage of said amplifier.

16. The combination according to claim 12, in which said potential source includes an amplifier adapted to produce said varying voltage and said voltage-increasing means includes means for varying the output voltage of said amplifier, in combination with means for driving said amplifier voltage varying means by said rotating means.

17. The combination according to claim 12, in which said potential source includes an amplifier adapted to produce said varying voltage, and said voltage-increasing means includes a cam and a potential-varying device operated by said cam for varying the output voltage of said amplifier, in combination with means for rotating said cam synchronously with the rotation of said member.

18. The combination according to claim 12, in which said potential source includes an amplifier adapted to produce said varying potential, and in which said voltage-increasing means includes a variable resistor in the circuit of said amplifier.

19. The combination according to claim 12, in which said potential source includes an amplifier adapted to produce said varying potential, and in which said voltage-increasing means includes a variable resistor in the circuit of said amplifier, in combination with means rotatable with said member for varying said resistor.

20. The combination according to claim 12, in which said potential source includes an amplifier adapted to produce said varying potential, and in which said voltage-increasing means includes a variable resistor in the circuit of said amplifier, in combination with a cam rotatable with said member for varying said resistor.

WILLIAM F. HOISINGTON.

REFERENCES CITED

The following references are of record in the file of this patent:

UNITED STATES PATENTS

| Number | Name | Date |
|---|---|---|
| 2,172,395 | McSpadden | Sept. 12, 1939 |
| 2,231,929 | Lyman | Feb. 18, 1941 |
| 2,241,809 | DeForest | May 13, 1941 |